United States Patent [19]
Boyles

[11] 3,830,345
[45] Aug. 20, 1974

[54] DISK BRAKES

[76] Inventor: Elmo N. Boyles, 540 E. Horatio Ave., Maitland, Fla. 32751

[22] Filed: Apr. 24, 1973

[21] Appl. No.: 354,083

[52] U.S. Cl............... 188/71.6, 188/72.5, 188/366, 188/264 AA
[51] Int. Cl............................................ F16d 55/00
[58] Field of Search ..... 188/366, 71.6, 72.5, 264 A, 188/269 AA; 192/88 A, 85 AA, 113 A, 70.12

[56] References Cited
UNITED STATES PATENTS

| | | | |
|---|---|---|---|
| 2,068,956 | 1/1937 | Brie | 188/71.6 |
| 2,835,357 | 5/1958 | Kelby et al. | 188/71.6 |
| 2,888,103 | 5/1959 | Armstrong | 188/366 |
| 2,971,611 | 2/1961 | Gage | 188/71.6 |
| 3,435,936 | 4/1969 | Warman | 192/88 A |
| 3,620,334 | 11/1971 | Henley et al. | 188/251 M |

*Primary Examiner*—Trygve M. Blix
*Assistant Examiner*—Sherman D. Basinger
*Attorney, Agent, or Firm*—Stein and Orman

[57] ABSTRACT

A disk brake assembly comprising a disk fixedly connected to a wheel of a vehicle so as to rotate therewith wherein brake linings, brake shoes, and actuating assemblies are mounted on opposite sides of the disk so as to force frictional engagement between the disk, linings and shoes thereby providing braking action on the disk to stop the vehicle. Each actuating assembly includes an annularly configured disk and correspondingly configured expandable tube in movable engagement therewith wherein expansion of the tube due to fluid flow thereto causes forceable engagement of each piston with a correspondingly located shoe so as to bring it in frictional engagement with the disk. Cooling means are provided in the form of one or more annularly configured ribs on the outer surface of the shoe and similarly, arcuately shaped ribs on the outer surface of the actuating assembly so as to readily dissipate heat occuring from frictional engagement between the brake shoe, linings and disk.

8 Claims, 11 Drawing Figures

PATENTED AUG 20 1974

DISK BRAKES

BACKGROUND OF THE INVENTION

1. Field of the Invention

This invention relates to a disk brake assembly including cooling means in the form of one or more ribs integrally formed on the shoe of the assembly and other structural components thereof wherein these ribs are spaced from cooperating structural elements so as to be exposed to free circulation and accordingly provide dissipation of heat in an efficient manner.

2. Detailed Description of the Prior Art

The majority of the prior art braking assemblies for motor vehicles include shoe-type brakes which generally are internally expanding and hydraulically operated. However, due to more efficient operation and more desirable performance characteristics, it has become increasingly popular to utilize the disk brake in vehicle braking assemblies.

Prior disk brakes normally comprise a partial disk-type in which an annular brake disc is attached to the rotating wheel and is gripped by pinches having circular or kidney-shaped brake pads with frictional lining to frictionally engage the disk. This frictional engagement, of course, serves to retard the rotation of the wheel and cause braking action on the vehicle.

Problems resulting in the use and operation of this type of brake assembly include the adequate dissipation of heat which is rapidly generated due to the frictional engagement of the shoe and/or linings with the disk itself. The presence of fading in a brake assembly is, of course, dangerous and various types of brake designs have been attempted in order to eliminate this problem.

Other additional problems in the brake industry is the providing of sufficient force to the disk in order to provide enough force to allow disk brakes to be used on large, heavy vehicles including airplanes, trucks, and the like. In order to accomplish sufficient force being delivered to the brake shoe and in turn being transferred to the disk, a plurality of pistons have normally been incorporated into the prior art disc brakes. However, problems have arisen in the design and construction of these prior art brake assemblies due to the fact that the actuating pistons cannot be made sufficiently large enough to apply the proper amount of force to the brake shoes so as to provide braking action on the disk.

Accordingly, there is readily seen in the prior art, a need for a commercially acceptable brake capable of delivering a substantially uniform force to the brake shoe which in turn is transferred into frictional engagement with the disk to provide sufficient braking force. In addition, the elimination of the cooling problem is a major factor in the production and commercial success of a disk brake assembly wherein a brake assembly for a vehicle designed to overcome the above-noted problems existing in the prior art should be relatively simple in design and uncomplicated in structure so as to eliminate high production and maintenance costs and thereby make it more attractive to the ultimate consumer.

SUMMARY OF THE INVENTION

The present invention relates to a disk brake assembly including cooling means specifically formed and disposed in the assembly to rapidly and efficiently cool the various structural elements thereof by exposing the cooling means and at least a portion of the elements to which they are attached, to free circulation. In addition, the actuating assembly of the present invention is positioned in working relation to the brake shoes and is configured and designed to apply a substantially uniform force over 360° of the correspondingly positioned annular surface of the brake shoe in an efficient manner wherein the force is of the magnitude which allows the subject brake assembly to be used on large, heavy vehicles including airplanes, trucks and other motor vehicles.

More particularly, the present disk brake assembly comprises an assembly housing including two housing portions, both of which have a substantially elongated configuration so as to only partially enclose the remainder of the assembly whereby the portion of the assembly not enclosed is freely exposed to atmosphere to obtain the benefit of the cooling effect provided by the circulating air, to be explained hereinafter.

A single brake disk is fixedly attached to a hub which at least partially defines a wheel of the vehicle on which the assembly is mounted. By virtue of this fixed mounting, the disk rotates with the wheel in the conventional manner. Brake lining means in the form of two annularly configured lining elements are mounted on opposite sides of the disk and are disposed between correspondingly positioned brake shoe elements and the disk itself. The lining elements are formed of a metallic or light heat conductive material such that the heat created through the friction resulting from application of the shoes to the linings and the brake disk will be conducted through the lining into the shoes where it will be dissipated as described above.

The brake assembly further comprises a pair of brake shoes each of said pair movably mounted on opposite sides of said disks and concentrically disposed relative to the axle of the vehicle on which the wheel associated with each brake assembly is mounted. Each brake shoe is disposed in substantially spaced relation from the actuating means which serves to force the shoe into frictional engagement with the lining and/or disk. This spaced apart relation between the actuating means and the shoe allows free circulation of air about the brake shoe and expansion tube of the actuation means, which will be described hereinafter, thereby aiding cooling of the assembly. More specifically, a first cooling means in the form of one or more ribs having an annular configuration corresponding to the general configuration of the disk are integrally formed along the outer surface of each brake shoe. If a plurality of ribs are used on the brake shoe, each of these ribs are arranged in concentric relation to one another. Each of the ribs are disposed and configured to extend into the space separating the actuating means and the remainder of the brake shoe. Again, positioning of the cooling ribs in this location allows them to be exposed to free circulation of the air passing about and through the assembly thereby efficiently aiding in the dispensing of heat accumulated in the shoe when it frictionally engages the lining and disk.

The brake assembly further comprises a pair of actuating assemblies, each assembly being mounted on opposite sides of the disk in cooperative engagement with the outer surface of the brake shoe so as to force it into engagement with the disk and lining thereon.

Each of the actuating assemblies further comprises an annularly configured piston arranged in spaced, cooperative relation to the outer surface of a brake shoe, correspondingly located. The piston is movable within and actuating assembly housing by means of an actuating means in the form of an expandable tube connected in fluid communication to a fluid source (not shown) whereupon flow of fluid into the tube causes its expansion and movement of the piston into forceable engagement with the shoe. This is done, forcing the shoe into frictional engagement with the lining and disk. Piston actuating means are disposed on the inner surface of the piston ring and positioned so as to provide a substantially uniform force on the shoe when it is forced into engagement therewith. The piston engaging means may be in the form of a plurality of fingers spaced substantially equally distant from one another so as to contact the outer surface of the shoe along a plurality of continuously disposed points.

As stated above, the actuating assembly housing is configured to at least partially enclose the expandable tube and the piston located therein. For efficient generation of force upon expansion of the expanding tube, the cross-sectional configuration of both the actuation assembly housing and the expanding tube is essentially the same along their engaging surfaces. More specifically one embodiment of the present invention comprises the cross-sectional configuration of the engaging surfaces of the tube and the assembly housing having a curvilinear configuration which serves to efficiently move the tube forward into engagement with the piston which in turn is forced into engagement with the correspondingly positioned shoes.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION

Figure 1:
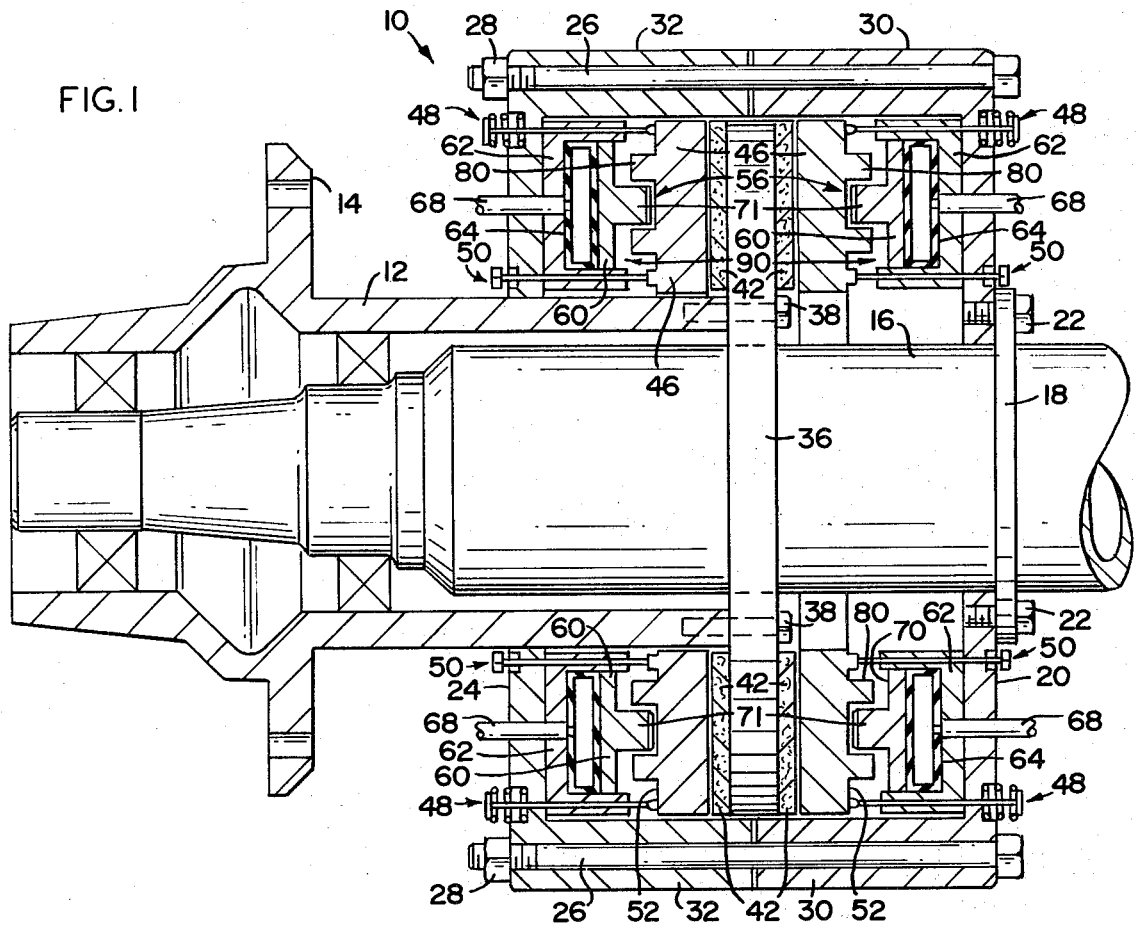
FIG. 1 is a cross-sectional view of the assembly mounted on an axle and attached to a hub which is connected to a wheel of the vehicle.
Figure 2:
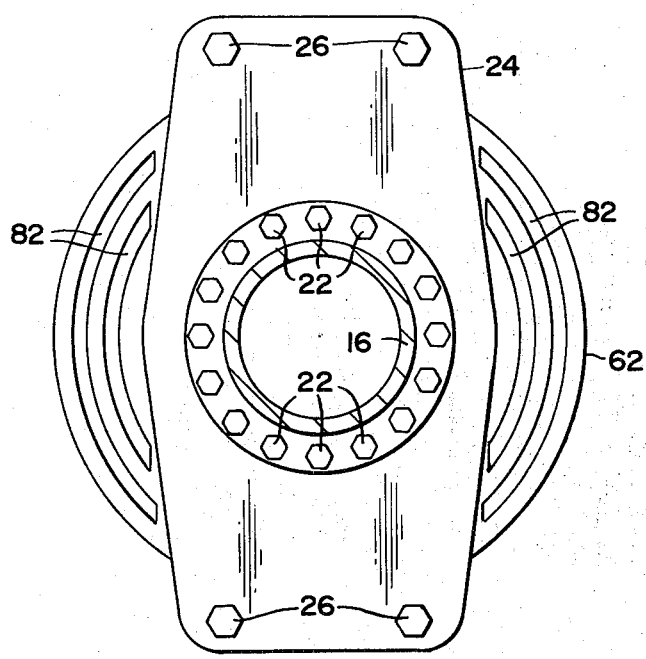
FIG. 2 is a side view of the exterior of the brake assembly showing the hub on which it is mounted in section.

This invention relates to a brake assembly generally indicated as 10 in FIG. 1 wherein the assembly is shown mounted on a hub 12 having wheel flange 14 integrally attached thereto. The assembly and its various structural components are concentrically mounted about axle 16 attached to the assembly and in supporting relation to the wheel hub 12 by means of an axle flange 18 connected to the brake housing 20 by means of connectors 22. As shown, the brake housing comprises two section, 20 and 24, each of which have an essentially elongated configuration as clearly shown in FIGS. 2 and 4. Each of the housing sections include flanges extending substantially perpendicular to the main portion of the housing section wherein the two sections are connected together by an elongated connector 26 secured by a conventional threaded bolt 28. These flanges 30 and 32 connected to housing sections 22 and 24 respectively, are located at opposite ends of the section and the entire configuration serves to at least partially surround the remainder of the disk brake assembly as shown.

Figure 5:
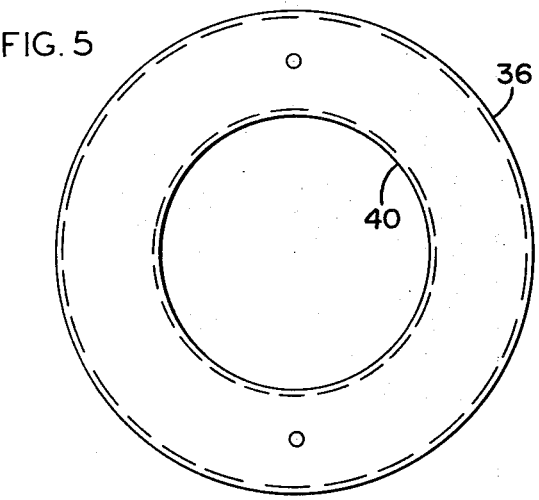
FIG. 5 is a detailed front view of the disk of the present invention.

The brake assembly further comprises a brake disk 36 connected to the hub 12 at one end thereof by connectors 38 as shown. Accordingly, the disk 36 is annularly configured as shown in FIG. 5 and is concentrically mounted about the axle 16 which passes through aperture 40 and is rotated thereabout by virtue of its being fixedly attached to the hub 12 causing it to rotate with the wheel affixed thereto.

Brake lining means comprise two lining elements 42 mounted on opposite sides of disk 36. The lining elements 42 may be mounted on support member 43 by connector 45. These linings 42 and the supports 43 are also annularly configured corresponding to the shape of the disk 36 such that braking force will be applied along opposite surfaces of the disk in a substantially uniform manner as to be described hereinafter.

Figure 6:
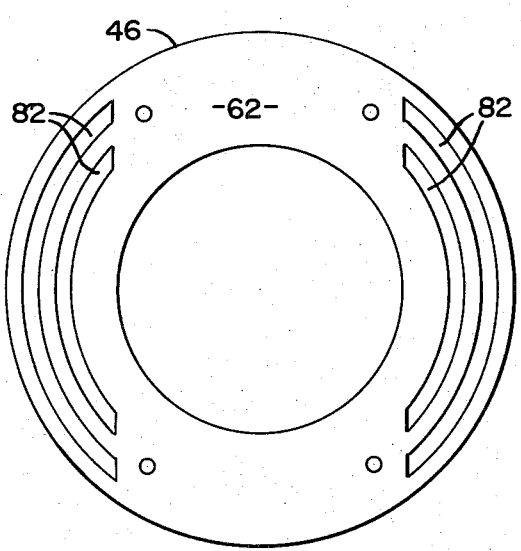
FIG. 6 is a detailed view of the actuating assembly housing.
Figure 7:
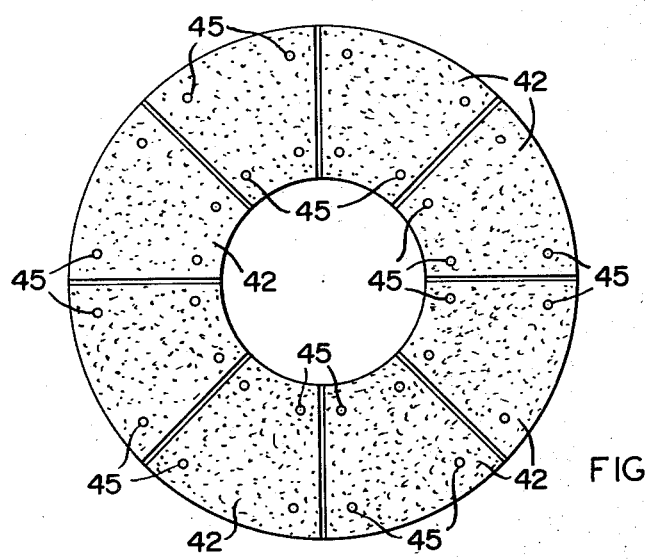
FIG. 7 is a detailed view of the brake lining.
Figure 8:
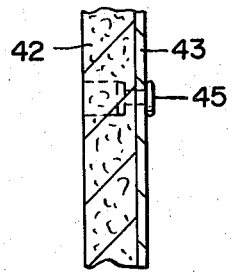
FIG. 8 is a detailed sectional view of means of attaching the lining to its supporting structural element.

The assembly further comprises a brake shoe mounted on each of the opposite sides of disk 36 and in working, movable engagement with the linings 42. These brake shoes 46 (FIG. 6) are annularly configured and concentrically disposed about hub 12 and axle 16. Reciprocal movement of shoes 46, in part, occurs through a biased mounting member generally indicated as 48 causing the brakes to be naturally biased away from engagement with lining 42. In addition, a brake adjustment means so as to position the precise disposition of each of the shoes is provided by brake adjustment means generally indicated as 50. The mounting and position of each brake shoe 46 is such that the outer surface 52 of each shoe is maintained in spaced relationship between the actuating means generally indicated as 56 which will be described hereinafter. This specifically alloted space serves to efficiently eliminate heat produced from the frictional engagement between the shoe, the brake lining and the brake disk as will be explained in detail hereinafter.

Each actuating assembly generally indicated as 56 comprising a piston member 60 annularly configured to be disposed concentrically about hub and axle 16. Each piston is movably arranged within actuation assembly housing 62 and is moved into engagement with the correspondingly position shoe 46 by an actuating means in the form of an expanding tube 64. This tube is disposed in sandwich-like fashion between the inner surface of housing 62 and the inner surface of piston 60. Fluid, in the form of hydraulic fluid or air under pressure is fed to the interior of the tube 64 by an inlet 68 and is fed from a supply source (not shown). Upon the fluid entering tube 64 it expands outwardly so as to force the piston 60 into engagement with the outer surface 52 of shoe member 46. This in turn forces the various shoes into frictional engagement with lining 42 and disk 36 braking force is thereby applied to the disk and the wheel of the vehicle is stopped.

Piston engaging means are mounted on surface 70 of each piston so as to be oriented in engageable relation to successive points along the surface 52 of each shoe. This allows a uniform pressure to be exerted on the shoe by the piston and in turn a uniform braking force be exerted on the lining and the disk. As shown in the preferred embodiment of the present invention, the piston engaging means may comprise a plurality of fingers arranged about surface 70 of each piston 60 in spaced relation to one another and substantially in equally spaced distance from the center of the annularly shaped piston. Alternately, the piston engaging means may have any configuration which has the effect of engaging the outer surface 52 of shoe 46 in a uniform manner such that the force is applied over a plurality of continuous locations or points which may or may not be contiguous to one another.

Figure 3:
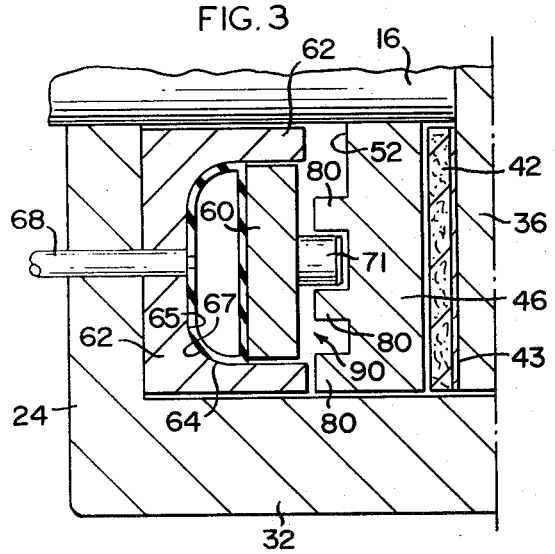
FIG. 3 is a detailed view in section showing another embodiment of the actuating assembly of the present invention.

Further structural features of the actuation assembly is clearly indicated in the embodiment shown in FIG. 3. For efficient application of the force exerted on piston 60 by tube 64, the engaging surfaces 65 and 67 of the actuation assembly housing 62 and the tube 64 respectively, defined correspondingly shaped cross-sectional configurations of those mating surfaces. More specifically, in the embodiment shown in FIG. 3, both of the engaging surfaces 65 and 67 have a curvilinear configuration which helps direct the force outwardly on to piston 60 when fluid flows into the interior of tube 64. In the embodiment shown in FIG. 1, the engaging surfaces of tube 64 and housing 62 are rectilinear shaped.

Another important feature of the present invention comprises the cooling structure in the subject brake assembly. More specifically, referring to FIG. 9, the shoe 46 has integrally formed thereon, one or more cooling ribs 80 extending outwardly from surface 52. These ribs 80 are disposed in the space 90 (FIGS. 1 and 3) defined between the actuating means including piston 60 and the surface 52 of the shoe. This allows these cooling ribs to be positioned in a free circulation space wherein they are exposed to atmosphere and to the cooling air.

Figure 10:
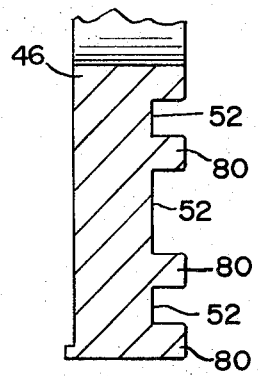
FIG. 10 is a sectional view of another embodiment of the brake showing a plurality of ribs comprising the cooling means of the subject invention.
Figure 11:
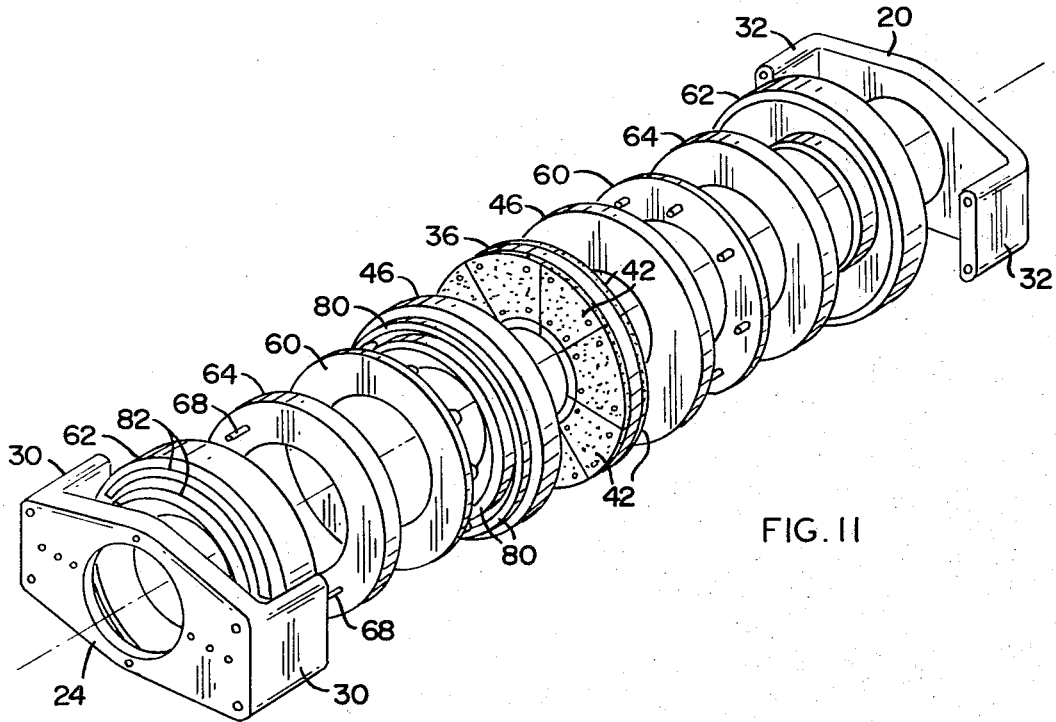
FIG. 11 is an exploded view showing the various structural elements comprising the brake assembly.

A second cooling means is provided in the form of substantially arcuate or curved shaped rib portions 82 formed in substantially concentric relation to one another on the exterior surface of actuating assembly housing 62. It should be noted that the specific arcuate configuration as clearly shown in FIG. 10 is provided so that these ribs are arranged on the exterior of brake housing 24 so as not to be enclosed thereby. This again allows them to be exposed to free circulating air and efficiently provides a cooling effect to the entire housing and specifically to the actuating assembly which is partially enclosed.

Figure 4:
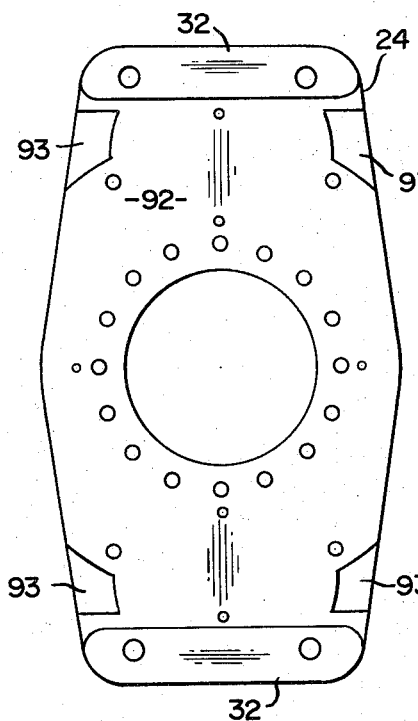
FIG. 4 is a detailed view of the interior surface of the brake housing.
Figure 9:
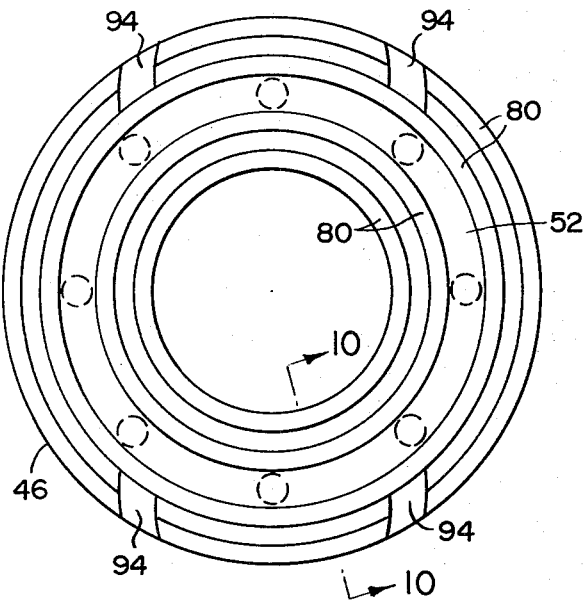
FIG. 9 is a detailed description of the brake shoe showing the cooling means thereon.

A further structural feature of the present invention comprises rotation preventing means mounted in cooperative relation to one another on both the interior surface 92 of the housing sections 20 and 24 (FIG. 4). As shown, wear lugs 93 may be integrally formed on this surface and are designed to lockingly engage correspondingly positioned wear lugs 94 on the exterior surface 52 of each brake shoe (FIG. 9). These cooperatively positioned pairs of lugs are oriented such that one pair is fitted inside the other, but in locking engagement with one another such that relative rotation between the housing sections 20 and 24 and the correspondingly positioned brake shoes 46 is prohibited.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A disc brake assembly designed to be mounted on an axle of a vehicle, said brake assembly comprising: a brake housing comprising two substantially similar configured sections, brake disc means fixedly attached to a wheel of the vehicle, brake shoe means including two brake shoe elements disposed on opposite sides of said disc and mounted in concentric relation to the axle so as to move in a direction substantially parallel to the longitudinal axis of the axle, brake lining means disposed between each said shoe element and an appropriate surface of said disc, an actuating assembly mounted adjacent each of said shoe elements within each said brake housing, each said actuating assembly comprising an actuating assembly housing having an annular configuration and being concentrically mounted about the axle, an annularly configured piston movably mounted within said actuating assembly housing in spaced relation to said correspondingly positioned shoe element, actuation means movably mounted in said assembly housing in biasing relation to said piston whereby movement of said actuating means relative to said assembly housing forces said piston into engagement with said correspondingly positioned shoe element and braking of said disc, each said piston comprising shoe engaging means including a plurality of fingers arranged in spaced relation to one another and radially spaced from the center of each of said pistons disposed on said piston to apply a substantially uniformly distributed force over the correspondingly positioned surface of said cooperatively positioned shoe element, each said actuating means of each assembly comprising a flexible tube having a substantially annular configuration corresponding to the configuration of each of said pistons whereby a substantially uniform force is exerted on said piston, a first cooling means formed on each said shoe element and disposed in spaced relation to said actuating assembly, said first cooling means comprising at least one rib integrally formed on each said shoe element and including a substantially annular configuration extending substantially continuously over the outer surface of each said shoe element, a second cooling means formed on each said actuating assembly, said second cooling means comprising at least one rib section having a plurality of spaced apart arcuate sections exposed to the atmosphere, said brake housing engaging said actuator assembly housing adjacent said arcuate sections, each said housing section being substantially elongated to only partially enclose the remainder of said assembly whereby said assembly including said first and second cooling means are completely exposed to the atmosphere.

2. A brake assembly as in claim 1 wherein said first cooling means comprises a plurality of substantially annular configured ribs formed on said shoe in spaced concentric relation to one another and in spaced relation to said cooperatively positioned actuating assembly.

3. A brake assembly as in claim 1 wherein each said second cooling means comprises a plurality of rib sections, each having an arcuate configuration, correspondingly positioned of said rib sections disposed in substantially spaced, concentric relation to one another.

4. A disk brake assembly as in claim 1 wherein each assembly housing and tube of each actuating assembly comprises correspondingly cross-sectional configuration whereby adjacently disposed surfaces of said cooperating assembly housing and tube cooperatively engage one another.

5. A disk brake assembly as in claim 4 wherein said correspondingly positioned and engaging surfaces of said assembly housing and said tube are at least partially curvilinear.

6. A disk brake assembly as in claim 1 wherein said lining means is formed from a metallic material, whereby heat created from frictional engagement during operation of the brake assembly will be conducted through the lining to the correspondingly positioned shoe means.

7. A disk brake assembly as in claim 1 further comprising rotation preventing means attached to both brake housing and said correspondingly positioned brake shoe.

8. A disk brake assembly as in claim 7 wherein said rotation preventing means comprises a plurality of pairs of wear lugs mounted on both said brake housing and said shoe in corresponding position and locking engagement, whereby relative rotation between said brake housing and said correspondingly positioned shoe is presented.

* * * * *